United States Patent
Lin

(10) Patent No.: US 10,382,364 B2
(45) Date of Patent: Aug. 13, 2019

(54) OPTICAL ACCESS DEVICE AND OPTICAL ACCESS SYSTEM

(71) Applicant: HUAWEI TECHNOLOGIES CO., LTD., Shenzhen, Guangdong (CN)

(72) Inventor: Liankui Lin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 14 days.

(21) Appl. No.: 15/865,147

(22) Filed: Jan. 8, 2018

(65) Prior Publication Data

US 2018/0131638 A1 May 10, 2018

Related U.S. Application Data

(63) Continuation of application No. PCT/CN2015/086221, filed on Aug. 6, 2015.

(51) Int. Cl.
*H04L 12/931* (2013.01)
*H04B 10/25* (2013.01)
(Continued)

(52) U.S. Cl.
CPC .......... *H04L 49/357* (2013.01); *H04B 10/25* (2013.01); *H04B 10/272* (2013.01);
(Continued)

(58) Field of Classification Search
CPC ... H04L 49/357; H04L 69/22; H04L 12/4633; H04Q 11/0067; H04B 10/272; H04B 10/25
See application file for complete search history.

(56) References Cited

U.S. PATENT DOCUMENTS 7,852,880 B2   12/2010   Solomon et al.
2009/0313690 A1   12/2009   Bichot et al.
(Continued)

FOREIGN PATENT DOCUMENTS

CN   1507206 A   6/2004
CN   101056474 A   10/2007
(Continued)

OTHER PUBLICATIONS

International Search Report and Written Opinion in International Application No. PCT/CN2015/086221, dated May 11, 2016, 13 pages.
(Continued)

*Primary Examiner* — Min Jung
(74) *Attorney, Agent, or Firm* — Fish & Richardson P.C.

(57) ABSTRACT

The present disclosure relates to an optical access device and an optical access system. The system includes a switching unit, at least two optical access devices, a network integrated processor, and a controller. The optical access device decapsulates an upstream data frame to obtain a payload, encapsulates the payload into a first upstream Ethernet frame, and then sends the first upstream Ethernet frame to the switching unit. The switching unit, which may comprise at least one switch, is configured to send the first upstream Ethernet frame to the network integrated processor, or send the first upstream Ethernet frame to the controller, and receive and send a second upstream Ethernet frame. The network integrated processor processes the first upstream Ethernet frame according to a received protocol parse instruction to obtain the second upstream Ethernet frame, and sends the second upstream Ethernet frame to the switching unit.

16 Claims, 4 Drawing Sheets

(51) Int. Cl.
*H04L 12/46* (2006.01)
*H04L 29/06* (2006.01)
*H04B 10/272* (2013.01)
*H04Q 11/00* (2006.01)
*H04B 10/40* (2013.01)

(52) U.S. Cl.
CPC .......... *H04L 12/4633* (2013.01); *H04L 69/22* (2013.01); *H04Q 11/0067* (2013.01); *H04B 10/40* (2013.01)

(56) References Cited

U.S. PATENT DOCUMENTS

| | | | | |
|---|---|---|---|---|
| 2011/0116796 | A1* | 5/2011 | Zheng | H04L 12/4633 398/45 |
| 2012/0121258 | A1 | 5/2012 | Li et al. | |
| 2014/0006481 | A1* | 1/2014 | Frey | H04L 41/0246 709/203 |
| 2014/0177452 | A1 | 6/2014 | Loehr | |
| 2015/0229563 | A1* | 8/2015 | Luo | H04L 45/74 370/392 |
| 2015/0264454 | A1 | 9/2015 | Xiao et al. | |
| 2016/0007103 | A1 | 1/2016 | Chen et al. | |
| 2016/0134954 | A1 | 5/2016 | Yang et al. | |
| 2016/0269284 | A1* | 9/2016 | Cheng | H04L 12/4633 |
| 2016/0294689 | A1* | 10/2016 | Zheng | H04L 47/00 |

FOREIGN PATENT DOCUMENTS

| | | |
|---|---|---|
| CN | 101753249 A | 6/2010 |
| CN | 101964924 A | 2/2011 |
| CN | 103222237 A | 7/2013 |
| CN | 203522744 U | 4/2014 |
| CN | 104253765 A | 12/2014 |
| JP | 2008538884 A | 11/2008 |
| JP | 2014525708 A | 9/2014 |
| WO | 2014086007 A1 | 6/2014 |
| WO | 2014139178 A1 | 9/2014 |
| WO | 2014148774 A1 | 9/2014 |
| WO | 2015085559 A1 | 6/2015 |

OTHER PUBLICATIONS

Extended European Search Report issued in European Application No. 15900066.0 dated Jul. 3, 2018, 5 pages.
Japanese Office Action issued in Japanese Application No. 2018-506123 dated Jan. 21, 2019, 7 pages.
Chinese Office Action issued in Chinese Application No. 201580076336.9 dated Jan. 28, 2019, 9 pages.

* cited by examiner

OPTICAL ACCESS DEVICE AND OPTICAL ACCESS SYSTEM

CROSS-REFERENCE TO RELATED APPLICATIONS

This application is a continuation of International Application No. PCT/CN2015/086221 filed on Aug. 6, 2015, the disclosure of which is hereby incorporated by reference in its entirety.

TECHNICAL FIELD

The present disclosure relates to the communications field, and in particular, to an optical access device and an optical access system.

BACKGROUND

With continuous development of communications technologies, an optical communications technology is increasingly widely applied. Correspondingly, a conventional network access device gradually develops into an optical access device.

An existing optical access device is generally a self-contained optical access device, and all optical access devices from manufacturers have dedicated protocols, dedicated interface standards, and the like of the optical access devices. For example, as shown in FIG. 1, an optical access device may include an optical access unit, two switching and control units, and an upstream unit. Specifically, after processing a received data frame, the optical access unit sends the data frame to one of the two switching and control units, and after performing complex switching processing on the data frame (for example, parsing, changing, forwarding, and switching the data frame), the switching and control unit sends the data frame to an Ethernet by using the upstream unit. In addition, the switching and control unit further needs to manage and control the optical access device. The switching and control unit usually interacts with another unit by using a dedicated protocol and a dedicated interface standard of the switching and control unit.

However, the existing optical access device is a self-contained optical access device, and all optical access devices from manufacturers have different dedicated protocols and different dedicated interface standards. Therefore, standardization of the optical access device is restricted, and the optical access device has relatively poor use flexibility.

SUMMARY

Embodiments of the present disclosure provide an optical access device and an optical access system, so as to implement function independence and standardization of the optical access system by implementing standardization of the optical access device, and to improve use flexibility of the optical access system.

To achieve the foregoing objectives, the following technical solutions are used in the embodiments of the present disclosure:

According to a first aspect, an embodiment of the present disclosure provides an optical access system, where the optical access system includes at least two optical access devices, a switching unit connected to the at least two optical access devices, and a network integrated processor and a controller that are connected to the switching unit;

each of the at least two optical access devices is configured to: receive an upstream data frame, decapsulate the upstream data frame according to a first protocol to obtain a payload of the upstream data frame, encapsulate the payload into a first upstream Ethernet frame according to an Ethernet protocol, and send the first upstream Ethernet frame to the switching unit;

the switching unit is configured to: receive the first upstream Ethernet frame sent by at least one of the at least two optical access devices, and send the first upstream Ethernet frame to the network integrated processor if the first upstream Ethernet frame is user data, or send the first upstream Ethernet frame to the controller if the first upstream Ethernet frame is management data; and receive a second upstream Ethernet frame sent by the network integrated processor, and send the second upstream Ethernet frame, where the second upstream Ethernet frame is an Ethernet frame obtained by processing the first upstream Ethernet frame by the network integrated processor;

the network integrated processor is configured to: receive the first upstream Ethernet frame sent by the switching unit, receive a protocol parse instruction sent by the controller, process the first upstream Ethernet frame according to the protocol parse instruction to obtain the second upstream Ethernet frame, and send the second upstream Ethernet frame to the switching unit; and the controller is configured to: receive the first upstream Ethernet frame sent by the switching unit, determine the protocol parse instruction according to the first upstream Ethernet frame, and send the protocol parse instruction to the network integrated processor.

With reference to the first aspect, in a first possible implementation of the first aspect, the switching unit includes at least one switch.

With reference to the first possible implementation of the first aspect, in a second possible implementation of the first aspect, the switching unit includes a first switch connected to the at least two optical access devices, a second switch connected to the network integrated processor, a third switch connected to the controller, and a fourth switch connected to each of the first switch, the second switch, and the third switch.

With reference to the second possible implementation of the first aspect, in a third possible implementation of the first aspect, each optical access device is connected to the first switch by using a high-speed data cable or an optical fiber.

With reference to the second possible implementation of the first aspect, in a fourth possible implementation of the first aspect, each optical access device is an optical access device line card, the first switch is a switch line card, and the optical access device line card is connected to the switch line card by using a backplane.

With reference to the second possible implementation of the first aspect, in a fifth possible implementation of the first aspect, each optical access device is an optical module, and the optical module is connected to a port of the first switch by using an interface of the optical module.

According to a second aspect, an embodiment of the present disclosure provides an optical access system, where the optical access system includes at least two optical access devices, a switching unit connected to the at least two optical access devices, and a network integrated processor and a controller that are connected to the switching unit;

each of the at least two optical access devices is configured to: receive a first downstream Ethernet frame sent by the switching unit, decapsulate the first downstream Ethernet frame according to an Ethernet protocol to obtain a payload of the first downstream Ethernet frame, encapsulate the payload into a downstream data frame according to a first protocol, and send the downstream data frame;

the switching unit is configured to: receive a second downstream Ethernet frame, and send the second downstream Ethernet frame to the network integrated processor if the second downstream Ethernet frame is user data, or send the second downstream Ethernet frame to the controller if the second downstream Ethernet frame is management data; and receive the first downstream Ethernet frame sent by the network integrated processor, and send the first downstream Ethernet frame to at least one of the at least two optical access devices according to a sending policy, where the first downstream Ethernet frame is an Ethernet frame obtained by processing the second downstream Ethernet frame by the network integrated processor;

the network integrated processor is configured to: receive the second downstream Ethernet frame sent by the switching unit, receive a protocol parse instruction sent by the controller, process the second downstream Ethernet frame according to the protocol parse instruction to obtain the first downstream Ethernet frame, and send the first downstream Ethernet frame to the switching unit; and the controller is configured to: receive the second downstream Ethernet frame sent by the switching unit, determine the protocol parse instruction according to the second downstream Ethernet frame, and send the protocol parse instruction to the network integrated processor.

With reference to the second aspect, in a first possible implementation of the second aspect, the switching unit includes at least one switch.

With reference to the first possible implementation of the second aspect, in a second possible implementation of the second aspect, the switching unit includes a first switch connected to the at least two optical access devices, a second switch connected to the network integrated processor, a third switch connected to the controller, and a fourth switch connected to each of the first switch, the second switch, and the third switch.

With reference to the second possible implementation of the second aspect, in a third possible implementation of the second aspect, each optical access device is connected to the first switch by using a high-speed data cable or an optical fiber.

With reference to the second possible implementation of the second aspect, in a fourth possible implementation of the second aspect, each optical access device is an optical access device line card, the first switch is a switch line card, and the optical access device line card is connected to the switch line card by using a backplane.

With reference to the second possible implementation of the second aspect, in a fifth possible implementation of the second aspect, each optical access device is an optical module, and the optical module is connected to a port of the first switch by using an interface of the optical module.

According to a third aspect, an embodiment of the present disclosure provides an optical access device, where the optical access device includes a first data encapsulation module, a data scheduling module connected to the first data encapsulation module, and a second data encapsulation module connected to the data scheduling module;

the first data encapsulation module is configured to: receive an upstream data frame, decapsulate the upstream data frame according to a first protocol to obtain a payload of the upstream data frame, and send the payload to the data scheduling module;

the data scheduling module is configured to: receive the payload sent by the first data encapsulation module, and send the payload to the second data encapsulation module according to bandwidth of the first data encapsulation module and bandwidth of the second data encapsulation module; and the second data encapsulation module is configured to: receive the payload sent by the data scheduling module, encapsulate the payload into a first upstream Ethernet frame according to an Ethernet protocol, and send the first upstream Ethernet frame.

With reference to the third aspect, in a first possible implementation of the third aspect, the optical access device is an optical access device line card.

With reference to the third aspect, in a second possible implementation of the third aspect, the optical access device further includes an optical transceiver module connected to the first data encapsulation module, and the upstream data frame is an optical signal;

the optical transceiver module is configured to: receive an electrical signal sent by an optical network device connected to the optical access device, convert the electrical signal into the optical signal, and send the optical signal to the first data encapsulation module; and the optical access device is an optical module.

According to a fourth aspect, an embodiment of the present disclosure provides an optical access device, where the optical access device includes a first data encapsulation module, a data scheduling module connected to the first data encapsulation module, and a second data encapsulation module connected to the data scheduling module;

the second data encapsulation module is configured to: receive a first downstream Ethernet frame, decapsulate the first downstream Ethernet frame according to an Ethernet protocol to obtain a payload of the first downstream Ethernet frame, and send the payload to the data scheduling module;

the data scheduling module is configured to: receive the payload sent by the second data encapsulation module, and send the payload to the first data encapsulation module according to bandwidth of the second data encapsulation module and bandwidth of the first data encapsulation module; and the first data encapsulation module is configured to: receive the payload sent by the data scheduling module, encapsulate the payload into a downstream data frame according to a first protocol, and send the downstream data frame.

With reference to the fourth aspect, in a first possible implementation of the fourth aspect, the optical access device is an optical access device line card.

With reference to the fourth aspect, in a second possible implementation of the fourth aspect, the optical access device further includes an optical transceiver module connected to the first data encapsulation module, and the downstream data frame is an optical signal;

the optical transceiver module is configured to: receive the optical signal sent by the first data encapsulation module, convert the optical signal into an electrical signal, and send the electrical signal to an optical network device connected to the optical access device; and the optical access device is an optical module.

The embodiments of the present disclosure provide the optical access device and the optical access system. The optical access system includes the at least two optical access devices, the switching unit connected to the at least two optical access devices, and the network integrated processor and the controller that are connected to the switching unit.

Each of the at least two optical access devices is configured to: receive the upstream data frame, decapsulate the upstream data frame according to the first protocol to obtain the payload of the upstream data frame, encapsulate the payload into the first upstream Ethernet frame according to the Ethernet protocol, and send the first upstream Ethernet frame to the switching unit. The switching unit is configured to: receive the first upstream Ethernet frame sent by the at least one of the at least two optical access devices, and send the first upstream Ethernet frame to the network integrated processor if the first upstream Ethernet frame is user data, or send the first upstream Ethernet frame to the controller if the first upstream Ethernet frame is management data; and receive the second upstream Ethernet frame sent by the network integrated processor, and send the second upstream Ethernet frame, where the second upstream Ethernet frame is the Ethernet frame obtained by processing the first upstream Ethernet frame by the network integrated processor. The network integrated processor is configured to: receive the first upstream Ethernet frame sent by the switching unit, receive the protocol parse instruction sent by the controller, process the first upstream Ethernet frame according to the protocol parse instruction to obtain the second upstream Ethernet frame, and send the second upstream Ethernet frame to the switching unit. The controller is configured to: receive the first upstream Ethernet frame sent by the switching unit, determine the protocol parse instruction according to the first upstream Ethernet frame, and send the protocol parse instruction to the network integrated processor.

According to the optical access system provided in the embodiments of the present disclosure, because the optical access device in the optical access system merely simply decapsulates and encapsulates the upstream data frame, and does not need to perform complex processing on the upstream data frame (for example, parsing, changing, forwarding, and switching the upstream data frame), a switching and control unit no longer needs to be disposed in the optical access device as that in the prior art, and the optical access device no longer needs a dedicated protocol and a dedicated interface standard. In addition, because all external interfaces of the optical access device in the optical access system use standard protocols, the optical access device can provide a standardized external interface. Furthermore, because functions such as switching, processing, and control in the optical access system are implemented by standardized devices, each of these standardized devices can provide a standardized external interface, and these standardized devices interact with each other without using a dedicated protocol and a dedicated interface standard. Therefore, in the embodiments of the present disclosure, function independence and standardization of the optical access system can be implemented by implementing standardization of the optical access device, and use flexibility of the optical access system is further improved.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
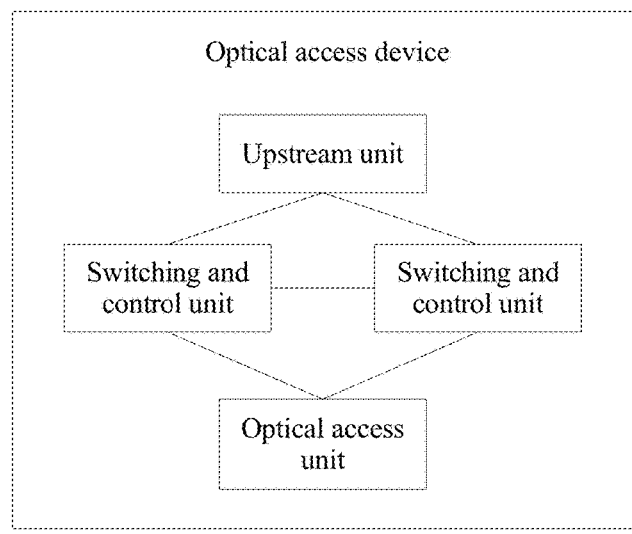
FIG. 1 is a schematic structural diagram of an optical access device in the prior art.

The following clearly describes the technical solutions in the embodiments of the present disclosure with reference to the accompanying drawings in the embodiments of the present disclosure.

In the embodiments of the present disclosure, terms "first" and "second" are merely used to distinguish between different technical features at different stages in technical features of a same type, but cannot be understood as an indication or implication of relative importance or an implicit indication of a quantity of indicated technical features. Therefore, a technical feature limited by "first" or "second" may explicitly or implicitly include one or more technical features. In description of the embodiments of the present disclosure, "multiple" generally means two or more unless otherwise stated.

The character "/" in this specification generally indicates an "or" relationship between associated objects. For example, A/B generally indicates A or B.

An optical access device provided in the embodiments of the present disclosure may be applied to an optical access system, and the optical access system may be applied to an optical network in which an optical fiber is used for communication. For example, in an actual application scenario of optical fiber communication, a user terminal sends upstream data to an optical network. An optical network device on one side of the user terminal converts an electrical signal that is received by the optical network device and that is sent by the user terminal into an optical signal, and sends the optical signal to an optical access device on one side of the user terminal. After simply scheduling, decapsulating, and encapsulating the optical signal, the optical access device transmits the optical signal to a switching unit. The switching unit sends the optical signal to a network integrated processor and a controller for processing. After processing the optical signal, the network integrated processor and the controller transmit the optical signal to an Ethernet. In this way, upstream data transmission by the user terminal is implemented in the optical network. A transmission medium of the optical signal may be an optical fiber, the optical signal may be a data frame whose carrier is a light wave, and the electrical signal may be a data frame whose carrier is an electromagnetic wave.

It should be noted that in the foregoing, upstream data transmission by the user terminal is merely used as an example to describe data transmission in the optical network. A process of downstream data transmission by the user terminal is basically symmetric to the process of upstream data transmission by the user terminal. For details, refer to related description in the following embodiments. Details are not described herein.

In the optical access system provided in the embodiments of the present disclosure, because the optical access device in the optical access system merely simply decapsulates and encapsulates a frame (including an upstream data frame and a first downstream Ethernet frame mentioned in the following embodiments) received by the optical access device, and does not need to perform complex processing on the frame (for example, parsing, changing, forwarding, and switching the frame), a switching and control unit no longer needs to be disposed in the optical access device as that in the prior art, and the optical access device no longer needs a dedicated protocol and a dedicated interface standard. In addition, because all external interfaces of the optical access device in the optical access system use standard protocols, the optical access device can provide a standardized external interface. Furthermore, because functions such as switching, processing, and control in the optical access system are implemented by standardized devices, each of these standardized devices can provide a standardized external interface, and these standardized devices interact with each other without using a dedicated protocol and a dedicated interface standard. Therefore, in the embodiments of the present disclosure, function independence and standardization of the optical access system can be implemented by implementing standardization of the optical access device, and use flexibility of the optical access system is further improved.

In the optical access system provided in the embodiments of the present disclosure, the process of upstream data transmission by the user terminal is basically symmetric to the process of downstream data transmission by the user terminal. Therefore, the process of upstream data transmission by the user terminal is separately described in detail in Embodiment 1 (an optical access system) and Embodiment 3 (an optical access device), and the process of downstream data transmission by the user terminal is separately described in detail in Embodiment 2 (an optical access system) and Embodiment 4 (an optical access device).

Data sent by the user terminal to the optical network is defined as upstream data, and data that is received by the user terminal and that is sent by the optical network is defined as downstream data. Specifically, "upstream" and "downstream" in the following embodiments may be understood according to this definition.

Embodiment 1

Figure 2:
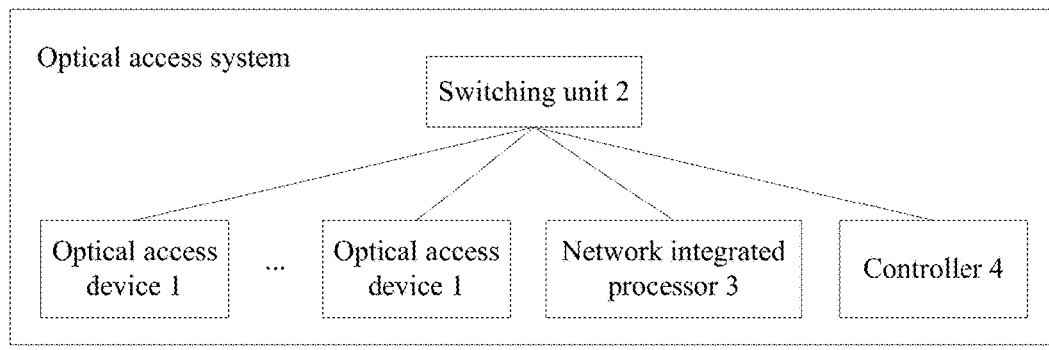
FIG. 2 is a first schematic diagram of an architecture of an optical access system according to an embodiment of the present disclosure.

As shown in FIG. 2, this embodiment of the present disclosure provides an optical access system. The optical access system may include at least two optical access devices 1, a switching unit 2 connected to the at least two optical access devices 1, and a network integrated processor 3 and a controller 4 that are connected to the switching unit 2.

Each of the at least two optical access devices 1 is configured to: receive an upstream data frame, decapsulate the upstream data frame according to a first protocol to obtain a payload of the upstream data frame, encapsulate the payload into a first upstream Ethernet frame according to an Ethernet protocol, and send the first upstream Ethernet frame to the switching unit 2.

The switching unit 2 is configured to: receive the first upstream Ethernet frame sent by at least one of the at least two optical access devices 1, and send the first upstream Ethernet frame to the network integrated processor 3 if the first upstream Ethernet frame is user data, or send the first upstream Ethernet frame to the controller 4 if the first upstream Ethernet frame is management data; and receive a second upstream Ethernet frame sent by the network integrated processor 3, and send the second upstream Ethernet frame, where the second upstream Ethernet frame is an Ethernet frame obtained by processing the first upstream Ethernet frame by the network integrated processor 3.

The network integrated processor 3 is configured to: receive the first upstream Ethernet frame sent by the switching unit 2, receive a protocol parse instruction sent by the controller 4, process the first upstream Ethernet frame according to the protocol parse instruction to obtain the second upstream Ethernet frame, and send the second upstream Ethernet frame to the switching unit 2.

The controller 4 is configured to: receive the first upstream Ethernet frame sent by the switching unit 2, determine the protocol parse instruction according to the first upstream Ethernet frame, and send the protocol parse instruction to the network integrated processor 3.

In this embodiment of the present disclosure, a module that can provide a standardized Ethernet interface may be disposed in the optical access device, to standardize the optical access device in the optical access system, and enable the optical access device to interact with an Ethernet by using the Ethernet protocol.

In this embodiment of the present disclosure, implementation of decapsulating the upstream data frame by the optical access device in the optical access system according to the first protocol to obtain the payload of the upstream data frame is the same as implementation of decapsulating a data frame by an optical access unit in an optical access device in the prior art. For details, refer to the implementation of decapsulating a data frame by the optical access unit in the optical access device in the prior art. Details are not described in this embodiment of the present disclosure.

Optionally, in this embodiment of the present disclosure, the first protocol supported by the optical access device varies with different optical networks to which the optical access device is applied. Specifically, the first protocol supported by the optical access device may be set according to an optical network to which the optical access device needs to be actually applied.

For example, when the optical access device provided in this embodiment of the present disclosure is applied to different optical networks, because the different optical networks use different communications protocols, the optical access device supports different first protocols. For example, when the optical access device is applied to a passive optical network (PON), the first protocol supported by the optical access device is the PON protocol. Specifically, the first protocol supported by the optical access device may be set according to an optical network to which the optical access device is actually applied. That is, the first protocol supported by the optical access device may adaptively change according to different optical networks to which the optical access device is actually applied. This is not limited in the present disclosure.

It should be noted that in a process of upstream data transmission by a user terminal, because the optical access device in the optical access system provided in this embodiment of the present disclosure merely simply decapsulates and encapsulates the upstream data frame, the optical access device in this embodiment of the present disclosure performs only physical (PHY) layer and Media Access Control (MAC) layer processing on the upstream data frame. Specifically, after receiving, at a PHY layer, the upstream data frame sent by an optical network device connected to the optical access device (the optical network device may be connected to multiple user terminals), the optical access device first decapsulates the received upstream data frame at a MAC layer according to the first protocol supported by the optical access device, that is, a frame header of the upstream data frame is removed, and the payload of the upstream data frame is reserved; encapsulates the payload at the MAC layer according to the Ethernet protocol, that is, a frame header of the Ethernet protocol is added to the payload to obtain the first upstream Ethernet frame; and then sends, at the PHY layer, the first upstream Ethernet frame to the switching unit connected to the optical access device for processing.

Optionally, in this embodiment of the present disclosure, the first upstream Ethernet frame may be a layer-2 Ethernet frame or a layer-3 Ethernet frame. This is not specifically limited in the present disclosure.

Optionally, the optical access device supports different first protocols, and correspondingly, the upstream data frame has different frame headers. For example, if the first protocol supported by the optical access device is the PON protocol, the frame header of the upstream data frame is a frame header of the PON protocol. Specifically, it may be specified, according to an actual use requirement, that the optical access device provided in this embodiment of the present disclosure supports different first protocols. This is not limited in the present disclosure.

In the optical access system provided in this embodiment of the present disclosure, because the optical access device can provide a standardized interface, and no longer needs a dedicated protocol and a dedicated interface standard, a requirement of each operator can be better met, and device investment costs and device operation and maintenance costs of the operator are further reduced.

In the optical access system provided in this embodiment of the present disclosure, after decapsulating the upstream data frame according to the first protocol supported by the optical access device to obtain the payload of the upstream data frame, the optical access device encapsulates the payload according to the standardized Ethernet protocol to obtain the first upstream Ethernet frame. It can be learned that in this embodiment of the present disclosure, the optical access device does not perform complex processing on the payload of the upstream data frame (for example, parsing, changing, forwarding, and switching the upstream data frame) as that in the prior art, but merely simply decapsulates and encapsulates the upstream data frame, that is, the upstream data frame changes only in terms of protocol format. Therefore, for the optical access device in this embodiment of the present disclosure, a switching and control unit no longer needs to disposed in the optical access device, and the optical access device no longer needs a dedicated protocol and a dedicated interface standard, thereby implementing standardization of the optical access device, and improving use flexibility of the optical access device. Further, function independence and standardization of the optical access system can be implemented by implementing standardization of the optical access device, and use flexibility of the optical access system is further improved.

The optical access device provided in this embodiment of the present disclosure may be an optical line terminal (OLT).

The optical network device provided in this embodiment of the present disclosure may be an optical network terminal (ONT), a multi-dwelling unit (MDU), or another optical network device such as an optical network unit (ONU). This is not specifically limited in the present disclosure.

In the process of upstream data transmission by the user terminal, the second upstream Ethernet frame sent by the switching unit may be sent by an optical access device on one side of another user terminal. The another user terminal is a user terminal that performs data transmission with the user terminal.

In this embodiment of the present disclosure, that the network integrated processor processes the first upstream Ethernet frame (the first upstream Ethernet frame is user data) according to the protocol parse instruction sent by the controller to obtain the second upstream Ethernet frame may be specifically: after completing processing such as frame header explanation, frame header change, frame content insertion, and frame content extraction on the first upstream Ethernet frame according to the protocol parse instruction sent by the controller, the network integrated processor changes the first upstream Ethernet frame into the second upstream Ethernet frame.

After receiving the first upstream Ethernet frame (the first upstream Ethernet frame is management data) sent by the switching unit, the controller may complete, according to the first upstream Ethernet frame, identification and parsing of a protocol related to the first upstream Ethernet frame to determine the protocol parse instruction, and send the protocol parse instruction to the network integrated processor.

Optionally, the controller 4 is further configured to control the at least two optical access devices 1, the network integrated processor 3, and the switching unit 2.

That the controller controls the at least two optical access devices may be specifically: the controller monitors a status of each of the at least two optical access devices (for example, whether each optical access device normally runs, and whether each optical access device runs at full load), and manages and configures each optical access device. Specifically, each of the at least two optical access devices may report the status of each optical access device (including a status of a power supply of the optical access device, a status of a clock interface of the optical access device, and an overall device status of the optical access device) to the controller, so that the controller can manage and configure the optical access device, such as the power supply and the clock interface of the optical access device, according to the status of each optical access device.

Further, in the foregoing data transmission process, the controller may further control the network integrated processor and the switching unit. For example, the controller may control the network integrated processor by sending the protocol parse instruction to the network integrated processor, and the controller may send a corresponding data switching policy to the switching unit, so that the switching unit performs switching processing on data. The controller may further monitor statuses of the network integrated processor and the switching unit. Implementation of monitoring the statuses of the network integrated processor and the switching unit by the controller is similar to the implementation of monitoring the status of the optical access device by the controller. For details, refer to the implementation of monitoring the status of the optical access device by the controller. Details are not described herein again.

Optionally, the switching unit 2 shown in FIG. 2 includes at least one switch.

In the optical access system provided in this embodiment of the present disclosure, the switching unit may be one switch, or two or more switches. This may be specifically set according to an actual use requirement, and is not limited in the present disclosure.

Figure 3:
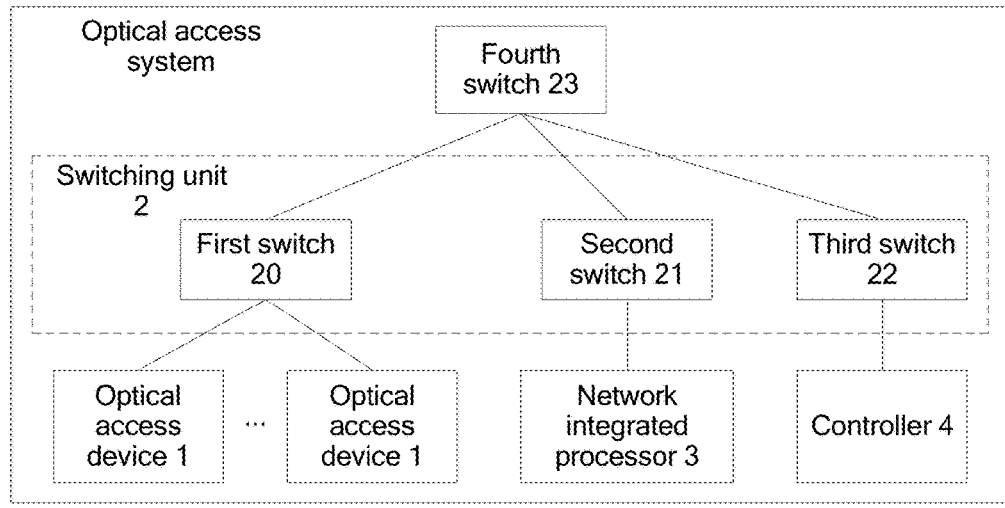
FIG. 3 is a second schematic diagram of an architecture of an optical access system according to an embodiment of the present disclosure.

Optionally, with reference to FIG. 2, as shown in FIG. 3, the switching unit 2 includes a first switch 20 connected to the at least two optical access devices 1, a second switch 21 connected to the network integrated processor 3, a third switch 22 connected to the controller 4, and a fourth switch 23 connected to each of the first switch 20, the second switch 21, and the third switch 22.

A person skilled in the art may understand that in FIG. 3, one first switch is merely used as an example for description, and there may be multiple first switches. This may be specifically set according to an actual use requirement, and is not limited in the present disclosure.

For example, during actual application, a switch generally has multiple ports, and each port may be connected to one optical access device. Therefore, the first switch shown in FIG. 3 may be generally connected to multiple optical access devices. Correspondingly, the fourth switch may be further connected to another first switch, and each first switch may be connected to multiple optical access devices.

Optionally, the at least two optical access devices may be connected to a same first switch, or may be connected to different first switches. This may be specifically set according to an actual use requirement, and is not limited in the present disclosure.

Both the network integrated processor and the controller may be a server. For example, operators that use the optical access system may compile corresponding code according to respective actual use requirements, and run the code on a computer (that is, functions of servers serving as the network integrated processor and the controller are implemented by using the computer), so as to perform corresponding processing on data in the optical access system, and correspondingly control the optical access system and each device in the optical access system.

In this embodiment of the present disclosure, a switching and control unit in an optical access device in the prior art is separated from the optical access device, and is implemented by using a standardized switch, a standardized network integrated processor, a standardized controller, and the like, so that the optical access device and the entire optical access system can be standardized. Therefore, different operators can deploy the optical access system according to respective requirements by using the foregoing independent and standardized devices, and use flexibility of the optical access system can be further improved.

In this embodiment of the present disclosure, a quantity of switches in the switching unit may be selected according to an actual deployment requirement of an optical network, and is not specifically limited in the present disclosure. That is, the quantity of switches in the switching unit shown in FIG. 3 is merely used as an example to describe the optical access system provided in this embodiment of the present disclosure, and the quantity does not constitute any limitation on the optical access system provided in this embodiment of the present disclosure.

Optionally, as shown in FIG. 3, in the optical access system provided in this embodiment of the present disclosure, each optical access device 1 is connected to the first switch 20 by using a high-speed data cable or an optical fiber.

In this embodiment of the present disclosure, each of the at least two optical access devices is connected to the first switch by using the high-speed data cable or the optical fiber, so as to improve a rate of data transmission between the optical access device and the first switch.

Optionally, the high-speed data cable may be made of metal. And, the high-speed data cable may be made of copper, that is, the high-speed data cable may be a high-speed copper cable.

In this embodiment of the present disclosure, each of the at least two optical access devices is connected to the first switch by using the high-speed copper cable, so that interference between different line cables can be reduced while a data transmission rate is improved.

Optionally, in this embodiment of the present disclosure, when the at least two optical access devices are connected to one first switch, a sum of bandwidth of the at least two optical access devices is equal to bandwidth of the first switch.

For example, it is assumed that the optical access system includes three optical access devices and one first switch. The three optical access devices are an optical access device A, an optical access device B, and an optical access device C, the first switch is a first switch D, and all the three optical access devices are connected to the first switch D. In this case, a sum of bandwidth of the optical access device A, bandwidth of the optical access device B, and bandwidth of the optical access device C is equal to bandwidth of the first switch D.

In this embodiment of the present disclosure, when the at least two optical access devices are connected to one first switch, the sum of the bandwidth of the at least two optical access devices is set to be equal to the bandwidth of the first switch, so as to ensure that data transmitted between each of the at least two optical access devices and the first switch is not congested, and further to ensure that each of the at least two optical access devices and the first switch have relatively high working efficiency.

Figure 4:
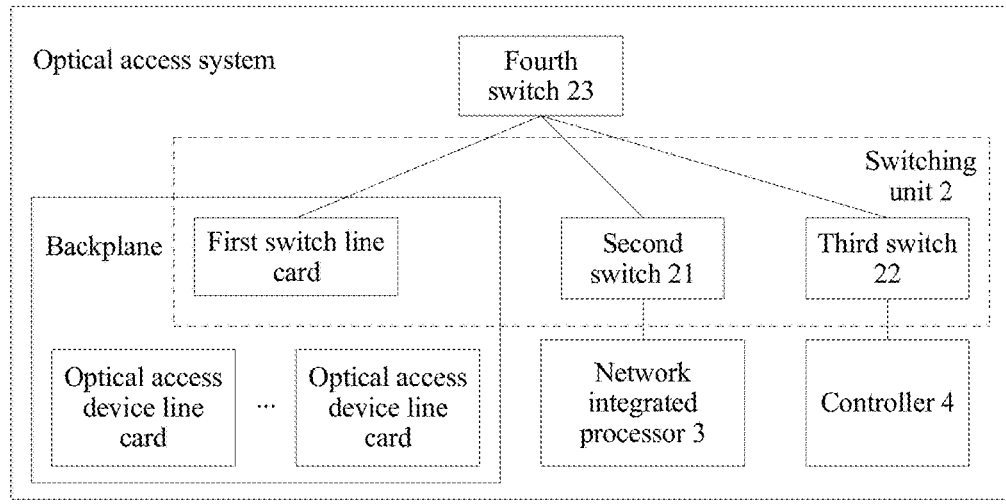
FIG. 4 is a third schematic diagram of an architecture of an optical access system according to an embodiment of the present disclosure.

Optionally, with reference to FIG. 3, as shown in FIG. 4, in the optical access system provided in this embodiment of the present disclosure, each optical access device 1 is an optical access device line card, the first switch 20 is a switch line card, and the optical access device line card is connected to the switch line card by using a backplane.

Optionally, each optical access device line card, the switch line card, and the backplane for connecting each optical access device line card to the switch line card may be disposed in one shelf.

In this embodiment of the present disclosure, the controller may further monitor and manage the switch line card, the backplane, the shelf, and the like. Specifically, the switch line card may report statuses of components (including statuses of power supplies of the components, overall statuses of the components, and the like) such as the switch line card, the backplane, and the shelf to the controller, so that the controller can manage the components according to the monitored statuses of the components.

In this embodiment of the present disclosure, each of the at least two optical access devices may be set to an optical access device line card, the first switch connected to these optical access devices may be set to a switch line card, and these optical access device line cards are connected to the switch line card by using backplanes. In the foregoing, each optical access device is connected to the first switch by using the high-speed data cable or the optical fiber. By contrast, in this setting manner, because each optical access device may be directly connected to the first switch by using the backplane, the high-speed data cable or the optical fiber can be saved, and optical network deployment costs are further reduced.

Optionally, in the optical access system provided in this embodiment of the present disclosure, each optical access device is an optical module, and the optical module is connected to a port of the first switch by using an interface of the optical module.

A structure and a size of the optical module serving as the optical access device are defined to be the same as a structure and a size of a standardized optical module in the prior art. For details, refer to the structure and the size of the standardized optical module in the prior art. Details are not described herein. In addition, specific implementation of the optical module serving as the optical access device in this embodiment of the present disclosure may be implemented by integrating functions (scheduling, encapsulation, and decapsulation) of the optical access device provided in this embodiment of the present disclosure into the standardized optical module in the prior art.

Figure 5:
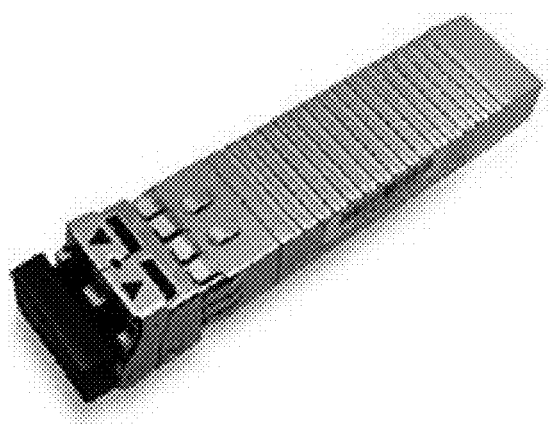
FIG. 5 is a schematic diagram of a form of an optical module according to an embodiment of the present disclosure.

As shown in FIG. 5, FIG. 5 is a schematic diagram of a possible form of the optical module serving as the optical access device. The optical access device provided in this embodiment of the present disclosure may be designed to be in a form of a standardized optical module, to facilitate standardization of the optical access device.

The optical module provided in this embodiment of the present disclosure may be in a standardized form such as SFP+ (10 gigabit small form factor pluggable), CFP4 (centum form-factor pluggable transceiver four), or QSFP+ (quad small form factor pluggable plus). The SFP+ is a hot-pluggable optical transceiver independent of a communications protocol, the CFP4 is a high-speed hot-pluggable optical transceiver, and the QSFP+ is a four-channel hot-pluggable optical transceiver.

Each of the at least two optical access devices provided in this embodiment of the present disclosure is set to an optical module, so that these optical access devices can be directly inserted into ports of the first switch without using the high-speed data cable or the optical fiber. Therefore, the high-speed data cable or the optical fiber can be saved, and optical network deployment costs are further reduced.

A person skilled in the art may understand that during actual application, the at least two optical access devices may be set to be in a same form (for example, the optical access device, the optical access device line card, or the optical module), or the at least two optical access devices may be set to be in different forms, for example, some of the at least two optical access devices are set to be in a form, and the other optical access devices are set to be in another form. This may be specifically set according to an actual use requirement, and is not limited in the present disclosure.

Setting the at least two optical access devices to be in a same form can simplify an implementation process of the optical access system compared with setting the at least two optical access devices to be in different forms. In this way, stability of the optical access system is enhanced, and overall performance of the optical access system is improved.

Optionally, in this embodiment of the present disclosure, the network integrated processor may be one server, or may be a server array including two or more servers. The controller may be one server, or may be a server array including two or more servers.

Specifically, when a data processing requirement and a control requirement in an optical network can be met by using one server, one server may be used to implement the network integrated processor and the controller. When a data processing requirement and a control requirement in an optical network cannot be met by using one server, two or more servers may be used to implement the network integrated processor and the controller.

Further, when the network integrated processor is a server array, two or more servers included in the server array may be connected to one second switch. Certainly, when a requirement of the server array cannot be met by using ports of the second switch, two or more second switches may be disposed in the optical access system provided in this embodiment of the present disclosure.

Correspondingly, when the controller is a server array, two or more servers included in the server array may be connected to one third switch. Certainly, when a requirement of the server array cannot be met by using ports of the third switch, two or more third switches may be disposed in the optical access system provided in this embodiment of the present disclosure.

In the optical access system provided in this embodiment of the present disclosure, because functions such as switching, processing, and control may be implemented by independent and standardized devices, these standardized devices can provide standardized external interfaces, and these standardized devices interact with each other without using a dedicated protocol and a dedicated interface standard, so that each operator can freely select devices that need to be used by the operator. Therefore, in the optical access system provided in this embodiment of the present disclosure, use flexibility of the optical access system can be improved by implementing function independence of the existing optical access device and standardization of a device for implementing a corresponding function.

This embodiment of the present disclosure provides the optical access system. The optical access system includes the at least two optical access devices, the switching unit connected to the at least two optical access devices, and the network integrated processor and the controller that are connected to the switching unit. Each of the at least two optical access devices is configured to: receive the upstream data frame, decapsulate the upstream data frame according to the first protocol to obtain the payload of the upstream data frame, encapsulate the payload into the first upstream Ethernet frame according to the Ethernet protocol, and send the first upstream Ethernet frame to the switching unit. The switching unit is configured to: receive the first upstream Ethernet frame sent by the at least one of the at least two optical access devices, and send the first upstream Ethernet frame to the network integrated processor if the first upstream Ethernet frame is user data, or send the first upstream Ethernet frame to the controller if the first upstream Ethernet frame is management data; and receive the second upstream Ethernet frame sent by the network integrated processor, and send the second upstream Ethernet frame, where the second upstream Ethernet frame is the Ethernet frame obtained by processing the first upstream Ethernet frame by the network integrated processor. The network integrated processor is configured to: receive the first upstream Ethernet frame sent by the switching unit, receive the protocol parse instruction sent by the controller, process the first upstream Ethernet frame according to the protocol parse instruction to obtain the second upstream Ethernet frame, and send the second upstream Ethernet frame to the switching unit. The controller is configured to: receive the first upstream Ethernet frame sent by the switching unit, determine the protocol parse instruction according to the first upstream Ethernet frame, and send the protocol parse instruction to the network integrated processor.

According to the optical access system provided in this embodiment of the present disclosure, because the optical access device in the optical access system merely simply decapsulates and encapsulates the upstream data frame, and does not need to perform complex processing on the upstream data frame (for example, parsing, changing, forwarding, and switching the upstream data frame), a switching and control unit no longer needs to be disposed in the optical access device as that in the prior art, and the optical access device no longer needs a dedicated protocol and a dedicated interface standard. In addition, because all external interfaces of the optical access device in the optical access system use standard protocols, the optical access device can provide a standardized external interface. Furthermore, because functions such as switching, processing, and control in the optical access system are implemented by standardized devices, each of these standardized devices can provide a standardized external interface, and these standardized devices interact with each other without using a dedicated protocol and a dedicated interface standard. Therefore, in this embodiment of the present disclosure, function independence and standardization of the optical access system can be implemented by implementing standardization of the optical access device, and use flexibility of the optical access system is further improved.

Embodiment 2

As shown in FIG. 2, this embodiment of the present disclosure provides an optical access system. The optical access system may include at least two optical access devices 1, a switching unit 2 connected to the at least two optical access devices 1, and a network integrated processor 3 and a controller 4 that are connected to the switching unit 2.

Each of the at least two optical access devices 1 is configured to: receive a first downstream Ethernet frame sent by the switching unit 2, decapsulate the first downstream Ethernet frame according to an Ethernet protocol to obtain a payload of the first downstream Ethernet frame, encapsulate the payload into a downstream data frame according to a first protocol, and send the downstream data frame.

The switching unit 2 is configured to: receive a second downstream Ethernet frame, and send the second downstream Ethernet frame to the network integrated processor 3 if the second downstream Ethernet frame is user data, or send the second downstream Ethernet frame to the controller 4 if the second downstream Ethernet frame is management data; and receive the first downstream Ethernet frame sent by the network integrated processor 3, and send the first downstream Ethernet frame to at least one of the at least two optical access devices according to a sending policy, where the first downstream Ethernet frame is an Ethernet frame obtained by processing the second downstream Ethernet frame by the network integrated processor 3.

The network integrated processor 3 is configured to: receive the second downstream Ethernet frame sent by the switching unit 2, receive a protocol parse instruction sent by the controller 4, process the second downstream Ethernet frame according to the protocol parse instruction to obtain the first downstream Ethernet frame, and send the first downstream Ethernet frame to the switching unit 2.

The controller 4 is configured to: receive the second downstream Ethernet frame sent by the switching unit 2, determine the protocol parse instruction according to the second downstream Ethernet frame, and send the protocol parse instruction to the network integrated processor 3.

In this embodiment of the present disclosure, a module that can provide a standardized Ethernet interface may be disposed in the optical access device, to standardize the optical access device in the optical access system, and enable the optical access device to interact with an Ethernet by using the Ethernet protocol.

In this embodiment of the present disclosure, implementation of encapsulating the payload of the first downstream Ethernet frame into the downstream data frame by the optical access device in the optical access system according to the first protocol is the same as implementation of encapsulating data by an optical access unit in an optical access device in the prior art. For details, refer to the implementation of encapsulating data by the optical access unit in the optical access device in the prior art. Details are not described in this embodiment of the present disclosure.

For specific description of the first protocol supported by the optical access device, refer to related description of the first protocol supported by the optical access device in Embodiment 1. Details are not described herein again.

It should be noted that in a process of downstream data transmission by a user terminal, because the optical access device in the optical access system provided in this embodiment of the present disclosure merely simply decapsulates and encapsulates the downstream Ethernet frame, the optical access device in this embodiment of the present disclosure performs only PHY layer and MAC layer processing on the downstream Ethernet frame. Specifically, after receiving, at a PHY layer, the first downstream Ethernet frame sent by the switching unit connected to the optical access device, the optical access device first decapsulates the first downstream Ethernet frame at a MAC layer according to the Ethernet protocol, that is, a frame header of the first downstream Ethernet frame is removed, and the payload of the first downstream Ethernet frame is reserved; encapsulates the payload at the MAC layer according to the first protocol supported by the optical access device, that is, a frame header of a corresponding communications protocol (that is, a communications protocol that is used in an optical network to which the optical access device is specifically applied and that is corresponding to the first protocol supported by the optical access device when the optical access device is applied to the optical network) is added to the payload to obtain the downstream data frame; and then sends, at the PHY layer, the downstream data frame to an optical network device connected to the optical access device for processing.

Optionally, in this embodiment of the present disclosure, the first downstream Ethernet frame may be a layer-2 Ethernet frame or a layer-3 Ethernet frame. This is not specifically limited in the present disclosure.

Optionally, the optical access device supports different first protocols, and correspondingly, the downstream data frame has different frame headers. For example, if the first protocol supported by the optical access device is the PON protocol, a frame header of the downstream data frame is a frame header of the PON protocol. Specifically, it may be specified, according to an actual use requirement, that the optical access device provided in this embodiment of the present disclosure supports different first protocols. This is not limited in the present disclosure.

Optionally, the switching unit may send the first downstream Ethernet frame to the at least one of the at least two optical access devices according to the sending policy in one of the following manners:

(1). The switching unit sends the first downstream Ethernet frame to the at least one of the at least two optical access devices according to a receiver address of the first downstream Ethernet frame. The first downstream Ethernet frame includes the receiver address of the first downstream Ethernet frame.

The receiver address of the first downstream Ethernet frame may be a broadcast address, a multicast address, or a unicast address. When the receiver address of the first downstream Ethernet frame is a unicast address, the receiver address of the first downstream Ethernet frame is the same as a MAC address of an optical access device that receives the first downstream Ethernet frame (in this case, the switching unit sends the first downstream Ethernet frame to only one optical access device).

(2). The switching unit sends the first downstream Ethernet frame to the at least one of the at least two optical access devices according to a transmission path that is of the first downstream Ethernet frame and that is sent by the controller. The transmission path of the first downstream Ethernet frame is used to indicate an optical access device/optical access devices to which the first downstream Ethernet frame needs to be sent by the switching unit.

(3). The switching unit sends the first downstream Ethernet frame to the at least one of the at least two optical access devices according to data processing speeds of the at least two optical access devices. For example, the at least one optical access device is an optical access device whose data processing speed is greater than or equal to a first threshold.

(4). The switching unit sends the first downstream Ethernet frame to the at least one of the at least two optical access devices according to distances between the at least two optical access devices and the switching unit. For example, the at least one optical access device is an optical access device whose distance from the switching unit is less than or equal to a second threshold.

The first threshold and the second threshold may be set according to an actual use requirement, and are not limited in the present disclosure.

The manners (1), (2), (3), and (4) are merely example description in which the switching unit sends the first downstream Ethernet frame to the at least one of the at least two optical access devices according to the sending policy in this embodiment of the present disclosure, and shall not constitute any limitation on the present disclosure. During actual application, there may be an implementation that can meet an actual use requirement other than the manners (1), (2), (3), and (4). Details are not described in this embodiment of the present disclosure.

In the optical access system provided in this embodiment of the present disclosure, because the optical access device can provide a standardized interface, and no longer needs a dedicated protocol and a dedicated interface standard, a requirement of each operator can be better met, and device investment costs and device operation and maintenance costs of the operator are further reduced.

In the optical access system provided in this embodiment of the present disclosure, after decapsulating the first downstream Ethernet frame according to the standardized Ethernet protocol to obtain the payload of the first downstream Ethernet frame, the optical access device encapsulates the payload according to the first protocol supported by the optical access device, to obtain the downstream data frame. It can be learned that in this embodiment of the present disclosure, the optical access device does not perform complex processing on the payload of the first downstream Ethernet frame (for example, parsing, changing, forwarding, and switching the first downstream Ethernet frame) as that in the prior art, but merely simply decapsulates and encapsulates the first downstream Ethernet frame, that is, the first downstream Ethernet frame changes only in terms of protocol format. Therefore, for the optical access device in this embodiment of the present disclosure, a switching and control unit no longer needs to disposed in the optical access device, and the optical access device no longer needs a dedicated protocol and a dedicated interface standard, thereby implementing standardization of the optical access device, and improving use flexibility of the optical access device. Further, function independence and standardization of the optical access system can be implemented by implementing standardization of the optical access device, and use flexibility of the optical access system is further improved.

The optical access device provided in this embodiment of the present disclosure may be an OLT.

The optical network device provided in this embodiment of the present disclosure may be an ONT, an MDU, or another optical network device such as an ONU. This is not specifically limited in the present disclosure.

In the process of downstream data transmission by the user terminal, the second downstream Ethernet frame received the switching unit may be sent by an optical access device on one side of another user terminal. The another user terminal is an optical access device that performs data transmission with the user terminal.

In this embodiment of the present disclosure, that the network integrated processor processes the second downstream Ethernet frame (the second downstream Ethernet frame is user data) according to the protocol parse instruction sent by the controller to obtain the first downstream Ethernet frame may be specifically: after completing processing such as frame header explanation, frame header change, frame content insertion, and frame content extraction on the second downstream Ethernet frame according to the protocol parse instruction sent by the controller, the network integrated processor changes the second downstream Ethernet frame into the first downstream Ethernet frame.

After receiving the second downstream Ethernet frame (the second downstream Ethernet frame is management data) sent by the switching unit, the controller may complete, according to the second downstream Ethernet frame, identification and parsing of a protocol related to the second downstream Ethernet frame to determine the protocol parse instruction, and send the protocol parse instruction to the network integrated processor.

Optionally, the controller 4 is further configured to control the at least two optical access devices 1, the network integrated processor 3, and the switching unit 2.

Specifically, for description of controlling the at least two optical access devices, the network integrated processor, and the switching unit by the controller, refer to related description of controlling the at least two optical access devices, the network integrated processor, and the switching unit by the controller in Embodiment 1. Details are not described herein again.

In comparison with the prior art, the controller provided in this embodiment of the present disclosure may simultaneously control the at least two optical access devices. Therefore, the at least two optical access devices can be uniformly controlled, and load balancing can be ensured between the at least two optical access devices. For example, if one of the at least two optical access devices encounters a fault, the controller may control the first downstream Ethernet frame that needs to be processed by the optical access device to be processed by another optical access device, so as to ensure reliability of transmitting the first downstream Ethernet frame.

Optionally, the switching unit 2 shown in FIG. 2 includes at least one switch.

In the optical access system provided in this embodiment of the present disclosure, the switching unit may be one switch, or two or more switches. This may be specifically set according to an actual use requirement, and is not limited in the present disclosure.

Optionally, with reference to FIG. 2, as shown in FIG. 3, the switching unit 2 includes a first switch 20 connected to the at least two optical access devices 1, a second switch 21 connected to the network integrated processor 3, a third switch 22 connected to the controller 4, and a fourth switch 23 connected to each of the first switch 20, the second switch 21, and the third switch 22.

A person skilled in the art may understand that in FIG. 3, one first switch is merely used as an example for description, and there may be two or more first switches. This may be specifically set according to an actual use requirement, and is not limited in the present disclosure.

For example, during actual application, a switch generally has multiple ports, and each port may be connected to one optical access device. Therefore, the first switch shown in FIG. 3 may be generally connected to multiple optical access devices. Correspondingly, the fourth switch may be further connected to another first switch, and each first switch may be connected to multiple optical access devices.

Optionally, the at least two optical access devices may be connected to a same first switch, or may be connected to different first switches. This may be specifically set according to an actual use requirement, and is not limited in the present disclosure.

Both the network integrated processor and the controller may be a server. Specifically, for other description and examples of the network integrated processor and the controller, refer to related description and examples of the network integrated processor and the controller in Embodiment 1. Details are not described herein again.

In this embodiment of the present disclosure, a switching and control unit in an optical access device in the prior art is separated from the optical access device, and is implemented by using a standardized switch, a standardized network integrated processor, a standardized controller, and the like, so that the optical access device and the entire optical access system can be standardized. Therefore, different operators can deploy the optical access system according to respective requirements by using the foregoing independent and standardized devices, and use flexibility of the optical access system can be further improved.

In this embodiment of the present disclosure, a quantity of switches in the switching unit may be selected according to an actual deployment requirement of an optical network, and is not specifically limited in the present disclosure. That is, the quantity of switches in the switching unit shown in FIG. 3 is merely used as an example to describe the optical access system provided in this embodiment of the present disclosure, and the quantity does not constitute any limitation on the optical access system provided in this embodiment of the present disclosure.

Optionally, as shown in FIG. 3, in the optical access system provided in this embodiment of the present disclosure, each optical access device 1 is connected to the first switch 20 by using a high-speed data cable or an optical fiber.

In this embodiment of the present disclosure, each of the at least two optical access devices is connected to the first switch by using the high-speed data cable or the optical fiber, so as to improve a rate of data transmission between the optical access device and the first switch.

Optionally, the high-speed data cable may be made of metal. Preferably, the high-speed data cable may be made of copper, that is, the high-speed data cable may be a high-speed copper cable.

In this embodiment of the present disclosure, each of the at least two optical access devices is connected to the first switch by using the high-speed copper cable, so that interference between different line cables can be reduced while a data transmission rate is improved.

Optionally, in this embodiment of the present disclosure, when the at least two optical access devices are connected to one first switch, a sum of bandwidth of the at least two optical access devices is equal to bandwidth of the first switch.

For example, it is assumed that the optical access system includes three optical access devices and one first switch. The three optical access devices are an optical access device A, an optical access device B, and an optical access device C, the first switch is a first switch D, and all the three optical access devices are connected to the first switch D. In this case, a sum of bandwidth of the optical access device A, bandwidth of the optical access device B, and bandwidth of the optical access device C is equal to bandwidth of the first switch D.

In this embodiment of the present disclosure, when the at least two optical access devices are connected to one first switch, the sum of the bandwidth of the at least two optical access devices is set to be equal to the bandwidth of the first switch, so as to ensure that data transmitted between each of the at least two optical access devices and the first switch is not congested, and further to ensure that each of the at least two optical access devices and the first switch have relatively high working efficiency.

Optionally, with reference to FIG. 3, as shown in FIG. 4, in the optical access system provided in this embodiment of the present disclosure, each optical access device 1 is an optical access device line card, the first switch 20 is a switch line card, and the optical access device line card is connected to the switch line card by using a backplane.

Optionally, each optical access device line card, the switch line card, and the backplane for connecting each optical access device line card to the switch line card may be disposed in one shelf.

In this embodiment of the present disclosure, the controller may further monitor and manage the switch line card, the backplane, the shelf, and the like. Specifically, the switch line card may report statuses of components (including statuses of power supplies of the components, overall statuses of the components, and the like) such as the switch line card, the backplane, and the shelf to the controller, so that the controller can manage the components according to the monitored statuses of the components.

In this embodiment of the present disclosure, each of the at least two optical access devices may be set to an optical access device line card, the first switch connected to these optical access devices may be set to a switch line card, and these optical access device line cards are connected to the switch line card by using backplanes. In the foregoing, each optical access device is connected to the first switch by using the high-speed data cable or the optical fiber. By contrast, in this setting manner, because each optical access device may be directly connected to the first switch by using the backplane, the high-speed data cable or the optical fiber can be saved, and optical network deployment costs are further reduced.

Optionally, in the optical access system provided in this embodiment of the present disclosure, each optical access device is an optical module, and the optical module is connected to a port of the first switch by using an interface of the optical module.

For description of specific implementation of the optical module serving as the optical access device, refer to related description of specific implementation of the optical module serving as the optical access device in Embodiment 1. Details are not described herein again.

Each of the at least two optical access devices provided in this embodiment of the present disclosure is set to an optical module, so that these optical access devices can be directly inserted into ports of the first switch without using the high-speed data cable or the optical fiber. Therefore, the high-speed data cable or the optical fiber can be saved, and optical network deployment costs are further reduced.

A person skilled in the art may understand that during actual application, the at least two optical access devices may be set to be in a same form (for example, the optical access device, the optical access device line card, or the optical module), or the at least two optical access devices may be set to be in different forms, for example, some of the at least two optical access devices are set to be in a form, and the other optical access devices are set to be in another form. This may be specifically set according to an actual use requirement, and is not limited in the present disclosure.

Setting the at least two optical access devices to be in a same form can simplify an implementation process of the optical access system compared with setting the at least two optical access devices to be in different forms. In this way, stability of the optical access system is enhanced, and overall performance of the optical access system is improved.

Optionally, in this embodiment of the present disclosure, the network integrated processor may be one server, or may be a server array including two or more servers. The controller may be one server, or may be a server array including two or more servers.

Specifically, when a data processing requirement and a control requirement in an optical network can be met by using one server, one server may be used to implement the network integrated processor and the controller. When a data processing requirement and a control requirement in an optical network cannot be met by using one server, two or more servers may be used to implement the network integrated processor and the controller.

Further, when the network integrated processor is a server array, two or more servers included in the server array may be connected to one second switch. Certainly, when a requirement of the server array cannot be met by using ports of the second switch, two or more second switches may be disposed in the optical access system provided in this embodiment of the present disclosure.

Correspondingly, when the controller is a server array, two or more servers included in the server array may be connected to one third switch. Certainly, when a requirement of the server array cannot be met by using ports of the third switch, two or more third switches may be disposed in the optical access system provided in this embodiment of the present disclosure.

In the optical access system provided in this embodiment of the present disclosure, because functions such as switching, processing, and control may be implemented by independent and standardized devices, these standardized devices can provide standardized external interfaces, and these standardized devices interact with each other without using a dedicated protocol and a dedicated interface standard, so that each operator can freely select devices that need to be used by the operator. Therefore, in the optical access system provided in this embodiment of the present disclosure, use flexibility of the optical access system can be improved by implementing function independence of the existing optical access device and standardization of a device for implementing a corresponding function.

This embodiment of the present disclosure provides the optical access system. The optical access system includes the at least two optical access devices, the switching unit connected to the at least two optical access devices, and the network integrated processor and the controller that are connected to the switching unit. Each of the at least two optical access devices is configured to: receive the first downstream Ethernet frame sent by the switching unit, decapsulate the first downstream Ethernet frame according to the Ethernet protocol to obtain the payload of the first downstream Ethernet frame, encapsulate the payload into the downstream data frame according to the first protocol, and send the downstream data frame. The switching unit is configured to: receive the second downstream Ethernet frame, and send the second downstream Ethernet frame to the network integrated processor if the second downstream Ethernet frame is user data, or send the second downstream Ethernet frame to the controller if the second downstream Ethernet frame is management data; and receive the first downstream Ethernet frame sent by the network integrated processor, and send the first downstream Ethernet frame to the at least one of the at least two optical access devices according to the sending policy, where the first downstream Ethernet frame is the Ethernet frame obtained by processing the second downstream Ethernet frame by the network integrated processor. The network integrated processor is configured to: receive the second downstream Ethernet frame sent by the switching unit, receive the protocol parse instruction sent by the controller, process the second downstream Ethernet frame according to the protocol parse instruction to obtain the first downstream Ethernet frame, and send the first downstream Ethernet frame to the switching unit. The controller is configured to: receive the second downstream Ethernet frame sent by the switching unit, determine the protocol parse instruction according to the second downstream Ethernet frame, and send the protocol parse instruction to the network integrated processor.

According to the optical access system provided in this embodiment of the present disclosure, because the optical access device in the optical access system merely simply decapsulates and encapsulates the first downstream Ethernet frame, and does not need to perform complex processing on the first downstream Ethernet frame (for example, parsing, changing, forwarding, and switching the first downstream Ethernet frame), a switching and control unit no longer needs to be disposed in the optical access device as that in the prior art, and the optical access device no longer needs a dedicated protocol and a dedicated interface standard. In addition, because all external interfaces of the optical access device in the optical access system use standard protocols, the optical access device can provide a standardized external interface. Furthermore, because functions such as switching, processing, and control in the optical access system are implemented by standardized devices, each of these standardized devices can provide a standardized external interface, and these standardized devices interact with each other without using a dedicated protocol and a dedicated interface standard. Therefore, in this embodiment of the present disclosure, function independence and standardization of the optical access system can be implemented by implementing standardization of the optical access device, and use flexibility of the optical access system is further improved.

Embodiment 3

Figure 6:
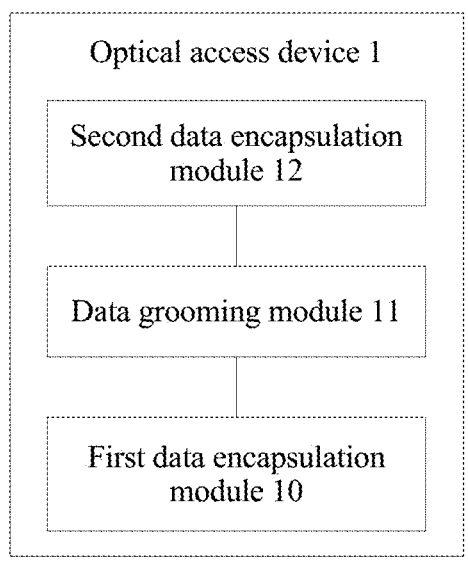
FIG. 6 is a first schematic structural diagram of an optical access device according to an embodiment of the present disclosure.

As shown in FIG. 6, this embodiment of the present disclosure provides an optical access device 1. The optical access device 1 includes a first data encapsulation module 10, a data scheduling module 11 connected to the first data encapsulation module 10, and a second data encapsulation module 12 connected to the data scheduling module 11.

The first data encapsulation module 10 is configured to: receive an upstream data frame, decapsulate the upstream data frame according to a first protocol to obtain a payload of the upstream data frame, and send the payload to the data scheduling module 11.

The data scheduling module 11 is configured to: receive the payload sent by the first data encapsulation module 10, and send the payload to the second data encapsulation module 12 according to bandwidth of the first data encapsulation module 10 and bandwidth of the second data encapsulation module 12.

The second data encapsulation module 12 is configured to: receive the payload sent by the data scheduling module 11, encapsulate the payload into a first upstream Ethernet frame according to an Ethernet protocol, and send the first upstream Ethernet frame.

In this embodiment of the present disclosure, the second data encapsulation module that can provide a standardized Ethernet interface may be disposed in the optical access device, to standardize the optical access device, and enable the optical access device to interact with an Ethernet by using the Ethernet protocol.

In this embodiment of the present disclosure, implementation of decapsulating the upstream data frame by the optical access device according to the first protocol to obtain the payload of the upstream data frame is the same as implementation of decapsulating a data frame by an optical access unit in an optical access device in the prior art. For details, refer to the implementation of decapsulating a data frame by the optical access unit in the optical access device in the prior art. Details are not described in this embodiment of the present disclosure.

Optionally, implementation of the first data encapsulation module in this embodiment of the present disclosure varies with different optical networks to which the optical access device is applied. Specifically, the first data encapsulation module may be set according to an optical network to which the optical access device needs to be actually applied. For example, according to a communications protocol used in the optical network to which the optical access device needs to be actually applied, the first data encapsulation module that can support the protocol is set. The protocol is the first protocol.

Optionally, the first data encapsulation module in the optical access device may be correspondingly designed according to a communications protocol used in an optical network to which the optical access device is actually applied. That is, the first data encapsulation module may adaptively change according to different communications protocols used in optical networks to which the optical access device is actually applied, so that the first data encapsulation module can support the communications protocol used in the corresponding optical network. This is not limited in the present disclosure.

For specific description of the first protocol supported by the first data encapsulation module, refer to related description of the first protocol supported by the optical access device in Embodiment 1. Details are not described herein again.

It should be noted that in a process of upstream data transmission by a user terminal, because the optical access device provided in this embodiment of the present disclosure merely simply grooms, decapsulates, and encapsulates the upstream data frame, both the first data encapsulation module and the second data encapsulation module perform only PHY layer and MAC layer processing on the upstream data frame. Specifically, after receiving, at a PHY layer, the upstream data frame sent by an optical network device connected to the optical access device (the optical network device may be connected to multiple user terminals), the first data encapsulation module first decapsulates the received upstream data frame at a MAC layer according to the first protocol supported by the first data encapsulation module, that is, a frame header of the upstream data frame is removed, and the payload of the upstream data frame is reserved; and then sends the payload to the data scheduling module. The data scheduling module sends the payload to the second data encapsulation module according to the bandwidth of the first data encapsulation module and the bandwidth of the second data encapsulation module. Correspondingly, after receiving the payload sent by the data scheduling module, the second data encapsulation module first encapsulates the payload at the MAC layer according to the Ethernet protocol, that is, a frame header of the Ethernet protocol is added to the payload to obtain the first upstream Ethernet frame; and then sends, at the PHY layer, the first upstream Ethernet frame to the switching unit connected to the optical access device for processing.

Optionally, the first data encapsulation module may generally provide multiple ports, for example, multiple first ports. The second data encapsulation module may also provide multiple ports, for example, multiple second ports. In the process of upstream data transmission by the user terminal, the data scheduling module grooms, to the second data encapsulation module according to bandwidth of the multiple first ports and bandwidth of the multiple second ports, the payload sent by the first data encapsulation module. The second data encapsulation module encapsulates the payload into the first upstream Ethernet frame, and then sends the first upstream Ethernet frame by using the multiple second ports.

Optionally, in this embodiment of the present disclosure, the first upstream Ethernet frame may be a layer-2 Ethernet frame or a layer-3 Ethernet frame. This is not specifically limited in the present disclosure.

Optionally, the first data encapsulation module supports different first protocols, and correspondingly, the upstream data frame has different frame headers. Specifically, it may be specified, according to an actual use requirement, that the first data encapsulation module provided in this embodiment of the present disclosure supports different first protocols. This is not limited in the present disclosure.

Because the optical access device provided in this embodiment of the present disclosure can provide a standardized interface, and no longer needs a dedicated protocol and a dedicated interface standard, a requirement of each operator can be better met, and device investment costs and device operation and maintenance costs of the operator are further reduced.

For other description of the optical access device, refer to related description of the optical access device in Embodiment 1. Details are not described herein again.

According to the optical access device provided in this embodiment of the present disclosure, the optical access device merely simply grooms, decapsulates, and encapsulates the upstream data frame, and does not need to perform complex processing on the upstream data frame (for example, parsing, changing, forwarding, and switching the upstream data frame). Therefore, in comparison with the prior art, for the optical access device in this embodiment of the present disclosure, a switching and control unit no longer needs to be disposed in the optical access device, and the optical access device no longer needs a dedicated protocol and a dedicated interface standard. In addition, because each of the first data encapsulation module and the second data encapsulation module in the optical access device in this embodiment of the present disclosure is a module using a standard protocol, the optical access device can provide a standardized external interface. Therefore, the optical access device provided in this embodiment of the present disclosure can implement standardization of the optical access device, and use flexibility of the optical access device is further improved.

A person skilled in the art may understand that a frame structure of the upstream data frame is corresponding to the communications protocol used in the optical network to which the optical access device is specifically applied in the foregoing example. For example, when the optical access device provided in this embodiment of the present disclosure is applied to an optical network, the upstream data frame uses a frame structure corresponding to a communications protocol used in the optical network.

Optionally, the optical access device provided in this embodiment of the present disclosure may be an optical access device line card.

The optical access device provided in this embodiment of the present disclosure is set to an optical access device line card, so that the optical access device can be directly connected to the switching unit without using a high-speed data cable or an optical fiber. Therefore, the high-speed data cable or the optical fiber can be saved, and optical network deployment costs are further reduced.

Figure 7:
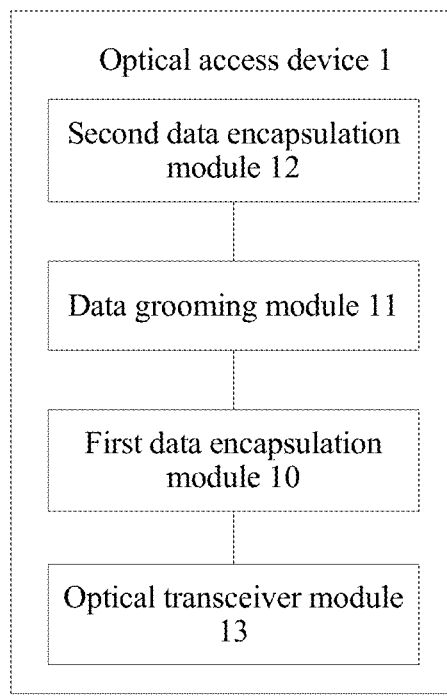
FIG. 7 is a second schematic structural diagram of an optical access device according to an embodiment of the present disclosure.

Optionally, with reference to FIG. 6, as shown in FIG. 7, the optical access device 1 provided in this embodiment of the present disclosure may further include an optical transceiver module 13 connected to the first data encapsulation module 10. The upstream data frame is an optical signal.

The optical transceiver module 13 is configured to: receive an electrical signal sent by the optical network device connected to the optical access device, convert the electrical signal into the optical signal, and send the optical signal to the first data encapsulation module 10.

It should be noted that for upstream data transmission by the user terminal, a signal received by the optical transceiver module from the optical network device connected to the optical access device is an electrical signal, and the optical transceiver module performs optical-to-electrical conversion on the electrical signal to obtain an optical signal, and sends the optical signal to the first data encapsulation module for processing.

In this embodiment shown in FIG. 7, because the optical transceiver module is integrated into the optical access device, the optical access device may be an optical module.

For description of specific implementation of the optical module serving as the optical access device, refer to related description of specific implementation of the optical module serving as the optical access device in Embodiment 1. Details are not described herein again.

The optical access device provided in this embodiment of the present disclosure is set to an optical module, so that the optical access device can be directly inserted into the switching unit (for example, a standardized switch in the prior art) without using a high-speed data cable or an optical fiber. Therefore, the high-speed data cable or the optical fiber can be saved, and optical network deployment costs are further reduced.

Optionally, the bandwidth of the first data encapsulation module 10 is equal to the bandwidth of the second data encapsulation module 12.

In this embodiment of the present disclosure, the bandwidth of the first data encapsulation module in the optical access device is set to be equal to the bandwidth of the second data encapsulation module, so as to ensure that data forwarded by the data scheduling module in the optical access device is not congested, and further to ensure that the optical access device has relatively high working efficiency.

The optical access device provided in this embodiment of the present disclosure may be an OLT.

The optical network device provided in this embodiment of the present disclosure may be an ONT, an MDU, or another optical network device such as an ONU. This is not specifically limited in the present disclosure.

This embodiment of the present disclosure provides the optical access device. The optical access device includes the first data encapsulation module, the data scheduling module connected to the first data encapsulation module, and the second data encapsulation module connected to the data scheduling module. The first data encapsulation module is configured to: receive the upstream data frame, decapsulate the upstream data frame according to the first protocol to obtain the payload of the upstream data frame, and send the payload to the data scheduling module. The data scheduling module is configured to: receive the payload sent by the first data encapsulation module, and send the payload to the second data encapsulation module according to the bandwidth of the first data encapsulation module and the bandwidth of the second data encapsulation module. The second data encapsulation module is configured to: receive the payload sent by the data scheduling module, encapsulate the payload into the first upstream Ethernet frame according to the Ethernet protocol, and send the first upstream Ethernet frame.

According to the optical access device provided in this embodiment of the present disclosure, because the optical access device provided in this embodiment of the present disclosure merely simply grooms, decapsulates, and encapsulates the upstream data frame, and does not need to perform complex processing on the upstream data frame (for example, parsing, changing, forwarding, and switching the upstream data frame), a switching and control unit no longer needs to be disposed in the optical access device as that in the prior art, and the optical access device no longer needs a dedicated protocol and a dedicated interface standard. In addition, because each of the first data encapsulation module and the second data encapsulation module in the optical access device in this embodiment of the present disclosure is a module using a standard protocol, the optical access device can provide a standardized external interface. Therefore, the optical access device provided in this embodiment of the present disclosure can implement standardization of the optical access device, and use flexibility of the optical access device is further improved.

Embodiment 4

As shown in FIG. 6, this embodiment of the present disclosure provides an optical access device 1. The optical access device 1 includes a first data encapsulation module 10, a data scheduling module 11 connected to the first data encapsulation module 10, and a second data encapsulation module 12 connected to the data scheduling module 11.

The second data encapsulation module 12 is configured to: receive a first downstream Ethernet frame, decapsulate the first downstream Ethernet frame according to an Ethernet protocol to obtain a payload of the first downstream Ethernet frame, and send the payload to the data scheduling module 11.

The data scheduling module 11 is configured to: receive the payload sent by the second data encapsulation module 12, and send the payload to the first data encapsulation module 10 according to bandwidth of the second data encapsulation module 12 and bandwidth of the first data encapsulation module 10.

The first data encapsulation module 10 is configured to: receive the payload sent by the data scheduling module 11, encapsulate the payload into a downstream data frame according to a first protocol, and send the downstream data frame.

In this embodiment of the present disclosure, the second data encapsulation module that can provide a standardized Ethernet interface may be disposed in the optical access device, to standardize the optical access device, and enable the optical access device to interact with an Ethernet by using the Ethernet protocol.

In this embodiment of the present disclosure, implementation of encapsulating the payload of the first downstream Ethernet frame into the downstream data frame by the optical access device according to the first protocol is the same as implementation of encapsulating data by an optical access unit in an optical access device in the prior art. For details, refer to the implementation of encapsulating data by the optical access unit in the optical access device in the prior art. Details are not described in this embodiment of the present disclosure.

Optionally, implementation of the first data encapsulation module in this embodiment of the present disclosure varies with different optical networks to which the optical access device is applied. Specifically, the first data encapsulation module may be set according to an optical network to which the optical access device needs to be actually applied. For example, according to a communications protocol used in the optical network to which the optical access device needs to be actually applied, the first data encapsulation module that can support the protocol is set. The protocol is the first protocol.

Optionally, the first data encapsulation module in the optical access device may be correspondingly designed according to a communications protocol used in an optical network to which the optical access device is actually applied. That is, the first data encapsulation module may adaptively change according to different communications protocols used in optical networks to which the optical access device is actually applied, so that the first data encapsulation module can support the communications protocol used in the corresponding optical network. This is not limited in the present disclosure.

For specific description of the first protocol supported by the first data encapsulation module, refer to related description of the first protocol supported by the optical access device in Embodiment 1. Details are not described herein again.

It should be noted that in a process of downstream data transmission by a user terminal, because the optical access device provided in this embodiment of the present disclosure merely simply grooms, decapsulates, and encapsulates the first downstream Ethernet frame, both the first data encapsulation module and the second data encapsulation module perform only PHY layer and MAC layer processing on the first downstream Ethernet frame. Specifically, after receiving, at a PHY layer, the first downstream Ethernet frame sent by the switching unit connected to the optical access device, the second data encapsulation module first decapsulates the first downstream Ethernet frame at a MAC layer according to the Ethernet protocol, that is, a frame header of the first downstream Ethernet frame is removed, and the payload of the first downstream Ethernet frame is reserved; and then sends the payload to the data scheduling module. The data scheduling module sends the payload to the first data encapsulation module according to the bandwidth of the second data encapsulation module and the bandwidth of the first data encapsulation module. Correspondingly, after receiving the payload sent by the data scheduling module, the first data encapsulation module first encapsulates the payload at the MAC layer according to the first protocol supported by the first data encapsulation module, that is, a frame header of a corresponding communications protocol (that is, a communications protocol that is used in an optical network to which the optical access device is specifically applied and that is corresponding to the first protocol supported by the first data encapsulation module when the optical access device is applied to the optical network) is added to the payload to obtain the downstream data frame; and then sends, at the PHY layer, the downstream data frame to an optical network device connected to the optical access device for processing.

Optionally, the first data encapsulation module may generally provide multiple ports, for example, multiple first ports. The second data encapsulation module may also provide multiple ports, for example, multiple second ports. In the process of downstream data transmission, the data scheduling module grooms, to the first data encapsulation module according to bandwidth of the multiple second ports and bandwidth of the multiple first ports, the payload sent by the second data encapsulation module. The first data encapsulation module encapsulates the payload into the downstream data frame, and then sends the downstream data frame by using the multiple first ports.

Optionally, in this embodiment of the present disclosure, the first downstream Ethernet frame may be a layer-2 Ethernet frame or a layer-3 Ethernet frame. This is not specifically limited in the present disclosure.

Optionally, the optical access device supports different first protocols, and correspondingly, the downstream data frame has different frame headers. Specifically, it may be specified, according to an actual use requirement, that the first data encapsulation module provided in this embodiment of the present disclosure supports different first protocols. This is not limited in the present disclosure.

Because the optical access device provided in this embodiment of the present disclosure can provide a standardized interface, and no longer needs a dedicated protocol and a dedicated interface standard, a requirement of each operator can be better met, and device investment costs and device operation and maintenance costs of the operator are further reduced.

For other description of the optical access device, refer to related description of the optical access device in Embodiment 1. Details are not described herein again.

According to the optical access device provided in this embodiment of the present disclosure, the optical access device merely simply grooms, decapsulates, and encapsulates the first downstream Ethernet frame, and does not need to perform complex processing on the first downstream Ethernet frame (for example, parsing, changing, forwarding, and switching the first downstream Ethernet frame). Therefore, in comparison with the prior art, for the optical access device in this embodiment of the present disclosure, a switching and control unit no longer needs to be disposed in the optical access device, and the optical access device no longer needs a dedicated protocol and a dedicated interface standard. In addition, because each of the first data encapsulation module and the second data encapsulation module in the optical access device in this embodiment of the present disclosure is a module using a standard protocol, the optical access device can provide a standardized external interface. Therefore, the optical access device provided in this embodiment of the present disclosure can implement standardization of the optical access device, and use flexibility of the optical access device is further improved.

A person skilled in the art may understand that a frame structure of the downstream data frame is corresponding to the communications protocol used in the optical network to which the optical access device is specifically applied in the foregoing example. For example, when the optical access device provided in this embodiment of the present disclosure is applied to an optical network, the downstream data frame uses a frame structure corresponding to a communications protocol used in the optical network.

Optionally, the optical access device provided in this embodiment of the present disclosure may be an optical access device line card.

The optical access device provided in this embodiment of the present disclosure is set to an optical access device line card, so that the optical access device can be directly connected to the switching unit without using a high-speed data cable or an optical fiber. Therefore, the high-speed data cable or the optical fiber can be saved, and optical network deployment costs are further reduced.

Optionally, with reference to FIG. 6, as shown in FIG. 7, the optical access device 1 provided in this embodiment of the present disclosure may further include an optical transceiver module 13 connected to the first data encapsulation module 10. The downstream data frame is an optical signal.

The optical transceiver module 13 is configured to: receive the optical signal sent by the first data encapsulation module 10, convert the optical signal into an electrical signal, and send the electrical signal.

It should be noted that for downstream data transmission by the user terminal, a signal received by the optical transceiver module from the first data encapsulation module is an optical signal, and the optical transceiver module performs optical-to-electrical conversion on the optical signal to obtain an electrical signal, and sends the electrical signal to the optical network device connected to the optical access device for processing.

In this embodiment shown in FIG. 7, because the optical transceiver module is integrated into the optical access device, the optical access device may be an optical module.

For description of specific implementation of the optical module serving as the optical access device, refer to related description of specific implementation of the optical module serving as the optical access device in Embodiment 1. Details are not described herein again.

The optical access device provided in this embodiment of the present disclosure is set to an optical module, so that the optical access device can be directly inserted into the switching unit (for example, a standardized switch in the prior art) without using a high-speed data cable or an optical fiber. Therefore, the high-speed data cable or the optical fiber can be saved, and optical network deployment costs are further reduced.

Optionally, the bandwidth of the first data encapsulation module 10 is equal to the bandwidth of the second data encapsulation module 12.

In this embodiment of the present disclosure, the bandwidth of the first data encapsulation module in the optical access device is set to be equal to the bandwidth of the second data encapsulation module, so as to ensure that data forwarded by the data scheduling module in the optical access device is not congested, and further to ensure that the optical access device has relatively high working efficiency.

The optical access device provided in this embodiment of the present disclosure may be an OLT.

The optical network device provided in this embodiment of the present disclosure may be an ONT, an MDU, or another optical network device such as an ONU. This is not specifically limited in the present disclosure.

This embodiment of the present disclosure provides the optical access device. The optical access device includes the first data encapsulation module, the data scheduling module connected to the first data encapsulation module, and the second data encapsulation module connected to the data scheduling module. The second data encapsulation module is configured to: receive the first downstream Ethernet frame, decapsulate the first downstream Ethernet frame according to the Ethernet protocol to obtain the payload of the first downstream Ethernet frame, and send the payload to the data scheduling module. The data scheduling module is configured to: receive the payload sent by the second data encapsulation module, and send the payload to the first data encapsulation module according to the bandwidth of the second data encapsulation module and the bandwidth of the first data encapsulation module. The first data encapsulation module is configured to: receive the payload sent by the data scheduling module, encapsulate the payload into the downstream data frame according to the first protocol, and send the downstream data frame.

According to the optical access device provided in this embodiment of the present disclosure, because the optical access device provided in this embodiment of the present disclosure merely simply grooms, decapsulates, and encapsulates the first downstream Ethernet frame, and does not need to perform complex processing on the first downstream Ethernet frame (for example, parsing, changing, forwarding, and switching the first downstream Ethernet frame), a switching and control unit no longer needs to be disposed in the optical access device as that in the prior art, and the optical access device no longer needs a dedicated protocol and a dedicated interface standard. In addition, because each of the first data encapsulation module and the second data encapsulation module in the optical access device in this embodiment of the present disclosure is a module using a standard protocol, the optical access device can provide a standardized external interface. Therefore, the optical access device provided in this embodiment of the present disclosure can implement standardization of the optical access device, and use flexibility of the optical access device is further improved.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical access system, wherein the optical access system comprises:
   at least two optical access devices;
   at least one switch connected to the at least two optical access devices; and
   a network integrated processor and a controller that are connected to the at least one switch;
   wherein each of the at least two optical access devices is configured to:
      receive an upstream data frame;
      decapsulate the upstream data frame according to a first protocol to obtain a payload of the upstream data frame;
      encapsulate the payload into a first upstream Ethernet frame according to an Ethernet protocol; and
      send the first upstream Ethernet frame to the at least one switch;
   wherein the at least one switch is configured to:
      receive the first upstream Ethernet frame sent by at least one of the at least two optical access devices;
      send the first upstream Ethernet frame to the network integrated processor if the first upstream Ethernet frame is user data, or send the first upstream Ethernet frame to the controller if the first upstream Ethernet frame is management data;
      receive a second upstream Ethernet frame sent by the network integrated processor; and
      send the second upstream Ethernet frame, wherein the second upstream Ethernet frame is an Ethernet frame obtained by processing the first upstream Ethernet frame by the network integrated processor;
   wherein the network integrated processor is configured to:
      receive the first upstream Ethernet frame sent by the at least one switch;
      receive a protocol parse instruction sent by the controller;
      process the first upstream Ethernet frame according to the protocol parse instruction to obtain the second upstream Ethernet frame; and
      send the second upstream Ethernet frame to the at least one switch; and
   wherein the controller is configured to:
      receive the first upstream Ethernet frame sent by the at least one switch;
      determine the protocol parse instruction according to the first upstream Ethernet frame; and
      send the protocol parse instruction to the network integrated processor.

2. The optical access system according to claim 1, wherein
   the at least one switch comprises a first switch connected to the at least two optical access devices, a second switch connected to the network integrated processor, a third switch connected to the controller, and a fourth switch connected to each of the first switch, the second switch, and the third switch.

3. The optical access system according to claim 2, wherein
   each optical access device is connected to the first switch by a high-speed data cable or an optical fiber.

4. The optical access system according to claim 2, wherein
   each optical access device is an optical access device line card,
   the first switch is a switch line card, and the optical access device line card is connected to the switch line card by using a backplane.

5. The optical access system according to claim 2, wherein
each optical access device is an optical module, and the optical module is connected to a port of the first switch by an interface of the optical module.

6. An optical access system, wherein the optical access system comprises:
at least two optical access devices;
at least one switch connected to the at least two optical access devices; and
a network integrated processor and a controller that are connected to the at least one switch;
wherein each of the at least two optical access devices is configured to:
receive a first downstream Ethernet frame sent by the at least one switch;
decapsulate the first downstream Ethernet frame according to an Ethernet protocol to obtain a payload of the first downstream Ethernet frame;
encapsulate the payload into a downstream data frame according to a first protocol; and
send the downstream data frame;
wherein the at least one switch is configured to:
receive a second downstream Ethernet frame; and
send the second downstream Ethernet frame to the network integrated processor if the second downstream Ethernet frame is user data, or send the second downstream Ethernet frame to the controller if the second downstream Ethernet frame is management data;
receive the first downstream Ethernet frame sent by the network integrated processor; and
send the first downstream Ethernet frame to at least one of the at least two optical access devices according to a sending policy, wherein the first downstream Ethernet frame is an Ethernet frame obtained by processing the second downstream Ethernet frame by the network integrated processor;
wherein the network integrated processor is configured to:
receive the second downstream Ethernet frame sent by the at least one switch;
receive a protocol parse instruction sent by the controller;
process the second downstream Ethernet frame according to the protocol parse instruction to obtain the first downstream Ethernet frame; and
send the first downstream Ethernet frame to the at least one switch; and
wherein the controller is configured to:
receive the second downstream Ethernet frame sent by the at least one switch, determine the protocol parse instruction according to the second downstream Ethernet frame; and
send the protocol parse instruction to the network integrated processor.

7. The optical access system according to claim 6, wherein
the at least one switch comprises a first switch connected to the at least two optical access devices, a second switch connected to the network integrated processor, a third switch connected to the controller, and a fourth switch connected to each of the first switch, the second switch, and the third switch.

8. The optical access system according to claim 7, wherein
each optical access device is connected to the first switch by using a high-speed data cable or an optical fiber.

9. The optical access system according to claim 7, wherein
each optical access device is an optical access device line card, the first switch is a switch line card, and the optical access device line card is connected to the switch line card by a backplane.

10. The optical access system according to claim 7, wherein
each optical access device is an optical module, and the optical module is connected to a port of the first switch by an interface of the optical module.

11. An optical access device, wherein the optical access device comprises a first data encapsulator, a data scheduler connected to the first data encapsulator, and a second data encapsulator connected to the data scheduler;
wherein the first data encapsulator is configured to:
receive an upstream data frame;
decapsulate the upstream data frame according to a first protocol to obtain a payload of the upstream data frame; and
send the payload to the data scheduler;
wherein the data scheduler is configured to:
receive the payload sent by the first data encapsulator; and
send the payload to the second data encapsulator according to bandwidth of the first data encapsulator and bandwidth of the second data encapsulator; and
wherein the second data encapsulator is configured to:
receive the payload sent by the data scheduler;
encapsulate the payload into a first upstream Ethernet frame according to an Ethernet protocol; and
send the first upstream Ethernet frame.

12. The optical access device according to claim 11, wherein
the optical access device is an optical access device line card.

13. The optical access device according to claim 11, wherein the optical access device further comprises an optical transceiver connected to the first data encapsulator, and the upstream data frame is an optical signal;
the optical transceiver is configured to:
receive an electrical signal sent by an optical network device connected to the optical access device;
convert the electrical signal into the optical signal; and
send the optical signal to the first data encapsulator; and
the optical access device is an optical module.

14. An optical access device, wherein the optical access device comprises a first data encapsulator, a data scheduler connected to the first data encapsulator, and a second data encapsulator connected to the data scheduler;
the second data encapsulator is configured to:
receive a first downstream Ethernet frame;
decapsulate the first downstream Ethernet frame according to an Ethernet protocol to obtain a payload of the first downstream Ethernet frame; and
send the payload to the data scheduler;
the data scheduler is configured to:
receive the payload sent by the second data encapsulator; and
send the payload to the first data encapsulator according to bandwidth of the second data encapsulator and bandwidth of the first data encapsulator; and
the first data encapsulator is configured to:
receive the payload sent by the data scheduler;

encapsulate the payload into a downstream data frame according to a first protocol; and send the downstream data frame.

15. The optical access device according to claim 14, wherein the optical access device is an optical access device line card.

16. The optical access device according to claim 14, wherein the optical access device further comprises an optical transceiver connected to the first data encapsulator, and the downstream data frame is an optical signal;

the optical transceiver is configured to:

receive the optical signal sent by the first data encapsulator;

convert the optical signal into an electrical signal; and send the electrical signal to an optical network device connected to the optical access device; and the optical access device is an optical module.

* * * * *